(12) United States Patent
Chen (10) Patent No.: US 8,696,000 B1
(45) Date of Patent: Apr. 15, 2014

(54) SCOOTER

(71) Applicant: Wang-Chuan Chen, Taichung (TW)

(72) Inventor: Wang-Chuan Chen, Taichung (TW)

( * ) Notice: Subject to any disclaimer, the term of this patent is extended or adjusted under 35 U.S.C. 154(b) by 0 days.

(21) Appl. No.: 13/740,340

(22) Filed: Jan. 14, 2013

(51) Int. Cl.
*B62M 1/00* (2010.01)

(52) U.S. Cl.
USPC .................................. 280/87.041; 280/11.28

(58) Field of Classification Search
USPC ......... 280/87.041, 87.042, 87.05, 11.28, 210, 280/771
See application file for complete search history.

(56) References Cited

U.S. PATENT DOCUMENTS

| | | | | |
|---|---|---|---|---|
| 2,330,147 | A * | 9/1943 | Rodriguez | 280/87.041 |
| 5,263,725 | A * | 11/1993 | Gesmer et al. | 280/11.28 |
| 6,286,843 | B1 * | 9/2001 | Lin | 280/11.28 |
| 6,299,186 | B1 * | 10/2001 | Kao et al. | 280/87.041 |
| 6,341,790 | B1 * | 1/2002 | Chen | 280/87.041 |
| 6,382,646 | B1 * | 5/2002 | Shaw | 280/87.041 |
| 7,226,081 | B2 * | 6/2007 | Chen | 280/771 |
| 2002/0167144 | A1 * | 11/2002 | Guang-Gwo | 280/87.041 |
| 2008/0197594 | A1 * | 8/2008 | Ling | 280/87.041 |
| 2009/0160150 | A1 * | 6/2009 | Johnson | 280/87.041 |
| 2010/0013183 | A1 * | 1/2010 | He | 280/210 |
| 2011/0025008 | A1 * | 2/2011 | Grossman | 280/87.041 |

FOREIGN PATENT DOCUMENTS

CN 2581304 Y 10/2003

* cited by examiner

*Primary Examiner* — Hau Phan
(74) *Attorney, Agent, or Firm* — Alan Kamrath; Kamrath IP Lawfirm, P.A.

(57) ABSTRACT

A scooter includes a deck assembly and a handlebar. The deck assembly includes a posterior portion and an anterior portion. The posterior portion is pivotally connected with a rear wheel. The anterior portion is pivotally connected with a wheel shaft. A pair of front wheels is pivotally connected with two opposite ends of the wheel shaft. The anterior portion has a first sliding slot. The wheel shaft has an engaging recess. An engaging member is sildably received in the first sliding slot to selectively engage with the engaging recess between first and second positions. The wheel shaft is fixed with respect to the anterior portion in the first position.

17 Claims, 12 Drawing Sheets

SCOOTER

BACKGROUND OF THE INVENTION

1. Field of the Invention

The present invention relates to a scooter and, more particular, to a scooter with selectively providing steering function thereof.

2. Description of the Related Art

China Patent No. 2,581,304 discloses a steering controller for a double front wheel scooter, which comprises a front fork rod, a connecting seat, a torsion spring, a connecting rod, a handle and a frame. The rear part of the front fork rod is provided with a fixed part, and the front part of the front fork rod is provided with two lugs which are downward provided with a pivot joint rod respectively. The pivot joint rod is provided with a ring groove of which the side edge position is provided with a clamp channel, and a perforation is arranged in the pivot joint rod. The connecting seat is pivotally connected to the pivot joint rod of the front fork rod. The connecting seat is provided with a containing groove of which the side edge is provided with a clamp channel. The bottom of the containing groove is provided with a perforation. The front end of the connecting seat is provided with a connecting block on which a through hole is arranged. The side edge of the connecting seat is provided with a pin joint block which is pivotally connected with wheels. The torsion spring is arranged in the containing groove of the connecting seat, and is provided with two end parts which are respectively fixed on the front fork rod and the clamp channel of the connecting seat. The connecting rod is pivotally connected with the connecting block of the connecting seat, and both ends of the connecting rod are respectively provided with the through hole. Accordingly, a rider leaning the handle results in both of the two front wheels deflecting synchronously, thereby to make the scooter swerving to the left or right.

However, leaning the handle to control the scooter swerving is not an easy steering way. When the rider intends the scooter leaned to make it swerving, the rider must support weight on one foot and the other foot pushing off the ground to propel the scooter. It is not suitable the rider having a poor sense of balance or slow reflexes to prone accidents easily.

Thus, a need exists for a novel scooter that mitigates and/or obviates the above disadvantages.

SUMMARY OF THE INVENTION

The present invention solves this need and other problems in the field of scooter by providing a scooter including a deck assembly and a handlebar. A scooter includes a deck assembly and a handlebar. The deck assembly includes a posterior portion and an anterior portion. The posterior portion is pivotally connected with a rear wheel. The anterior portion is pivotally connected with a wheel shaft. A pair of front wheels is pivotally connected with two opposite ends of the wheel shaft. The anterior portion has a first sliding slot. The wheel shaft has an engaging recess. An engaging member is sildably received in the first sliding slot to selectively engage with the engaging recess between first and second positions. The wheel shaft is fixed with respect to the anterior portion in the first position.

Preferably, the engaging member is radially slidable with respect to the first sliding slot.

In an example, the anterior portion includes bottom and top sections faced each other. The wheel shaft is arranged between the bottom and top sections.

The first sliding slot penetrates through the bottom and top sections.

In another example, the deck assembly includes first and second boards connected with each other. The first and second boards are collectively formed a pedal portion and the posterior portion. The second board is formed the anterior portion.

Preferably, the top section of the anterior portion includes first and second bumps arranged adjacent to two opposite ends of the first sliding slot. The engaging member includes first and second apertures (294,295) respectively extending therethrough. The first aperture is engaged with the first bump in the first position, and the second aperture is engaged with the second bump in the second position.

It is an object of the present invention to provide the engaging member operated between first and second positions to selectively providing steering function of the scooter. The engaging member in the first position engages with the engaging recess of the wheel shaft to cause the wheel shaft fixed with respect to the anterior portion. The engaging member in the second position disengages from the engaging recess of the wheel shaft to cause the wheel shaft 26 pivotable with respect to the anterior portion.

It is another object of the present invention to provide the engaging member slidably received in and radially moved in relation to the first sliding slot to prevent the engaging member disengaged from the first sliding slot due to the scooter swerved and jolted, and to ensure the scooter safe to use.

Other objects, advantages, and new features of the present invention will become apparent from the following detailed description of the invention when considered in conjunction with the accompanied drawings.

BRIEF DESCRIPTION OF THE DRAWINGS

The illustrative embodiments may best be described by reference to the accompanying drawings where.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "end", "portion", "longitudinal", "radial", "diameter", "width", "thickness", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE PREFERRED EMBODIMENT

FIGS. 1 through 5 show a scooter according to the present invention shown in the drawings. The scooter 10 includes a deck assembly 20 and a handlebar 30 mounted on one end of the deck assembly 20.

The deck assembly 20 includes first and second boards 21 and 22 connected with each other, a pedal portion 23, and a posterior portion 24. The first and second boards 21 and 22 collectively form the pedal portion 23 and the posterior portion 24. The second board 22 is formed an anterior portion 25. The pedal portion 23 is adapted for supporting a rider standing thereon. The posterior and anterior portions 24 and 25 are arranged at two opposite ends of the pedal portion 23. The posterior portion 24 is pivotally connected with a rear wheel 241. The anterior portion 25 is pivotally connected with a wheel shaft 26. The anterior portion 25 includes bottom and top sections 27 and 28 faced each other, and the wheel shaft 26 is arranged between the bottom and top sections 27 and 28. A pair of front wheels 261 is pivotally connected with two opposite ends of the wheel shaft 26. The anterior portion 25 has a first pivoting hole 251 penetrating through the bottom and top sections 27 and 28. The wheel shaft 26 has a second pivoting hole 262. A fastener 263 passes through the first and second pivoting holes 251 and 262 and engages with a bolt 90 to cause the wheel shaft 26 pivotable with respect to the anterior portion 25.

The anterior portion 25 further includes two positioning columns 252, two positioning members 253, and an elastic member 254. The two positioning columns 252 are respectively formed on the bottom section 27 and extended toward the top section 28. The elastic member 254 is substantively U-shaped and includes two turning portions 255. Each of the two turning portions 255 is formed a torsion section 256. The two turning portions 255 are engaged with the two positioning columns 252. Each of the two positioning members 253 is mounted to one end of each of the two positioning columns 252 opposite to the bottom section 27 and abutted against the elastic member 254.

The wheel shaft 26 is provided with two apertures 264. The elastic member 254 is formed two abutting portions 257 extending from the two torsion sections 256. Two opposite ends of the elastic member 254 are engaged into the two apertures 264. The two abutting portions 257 are abutted against the wheel shaft 26. The anterior portion 25 further includes a first sliding slot 258 penetrating through the bottom and top sections 27 and 28. The first sliding slot 258 is formed in an oval shape. One end of the second board 22 opposite to the posterior portion 24 is formed a fender portion 221. The fender portion 221 covers on the anterior portion 25 and includes a second sliding slot 222 formed in an oval shape corresponding to the first sliding slot 258.

The wheel shaft 26 includes an engaging recess 265. The deck assembly 20 further includes an engaging member 29. The engaging member 29 has first and second sliding portions 291 and 292, and an engaging portion 293 formed at the first sliding portion 291. The engaging member 29 is slidably received in the first and second sliding slots 258 and 222 and radially moved in relation to the anterior portion 25. The first sliding portion 291 is received in the first sliding slot 258, and the second sliding portion 292 is received in the second sliding slot 222 to cause the engaging member 29 able to slide with respect to the anterior portion 25.

FIGS. 6 through 12 show the engaging member 29 operated between first and second positions to selectively providing steering function of the scooter 10 to be suitable for the rider having a poor sense of balance or slow reflexes. When the engaging member 29 is in the first position, the engaging portion 293 of the engaging member 29 engages with the engaging recess 265 of the wheel shaft 26 to cause the wheel shaft 26 fixed with respect to the anterior portion 25. When the engaging member 29 is in the second position, the engaging portion 293 of the engaging member 29 disengages from the engaging recess 265 of the wheel shaft 26 to cause the wheel shaft 26 being pivotable with respect to the anterior portion 25.

The top section 28 of the anterior portion 25 includes first and second bumps 281 and 282 arranged adjacent to two opposite ends of the first sliding slot 258 and extending opposite to the bottom section 27. The engaging member 29 further includes first and second apertures 294 and 295 respectively extending through the second sliding portion 292 and selectively engaged with the first and second bumps 281 and 282 of the top section 28 of the anterior portion 25. When the engaging member 29 is in the first position, the first aperture 294 is engaged with the first bump 281. When the engaging member 29 is in the second position, the second aperture 295 is engaged with the second bump 282. Therefore, the engaging member 29 is selectively arranged in the first or second position securely.

Figure 1:
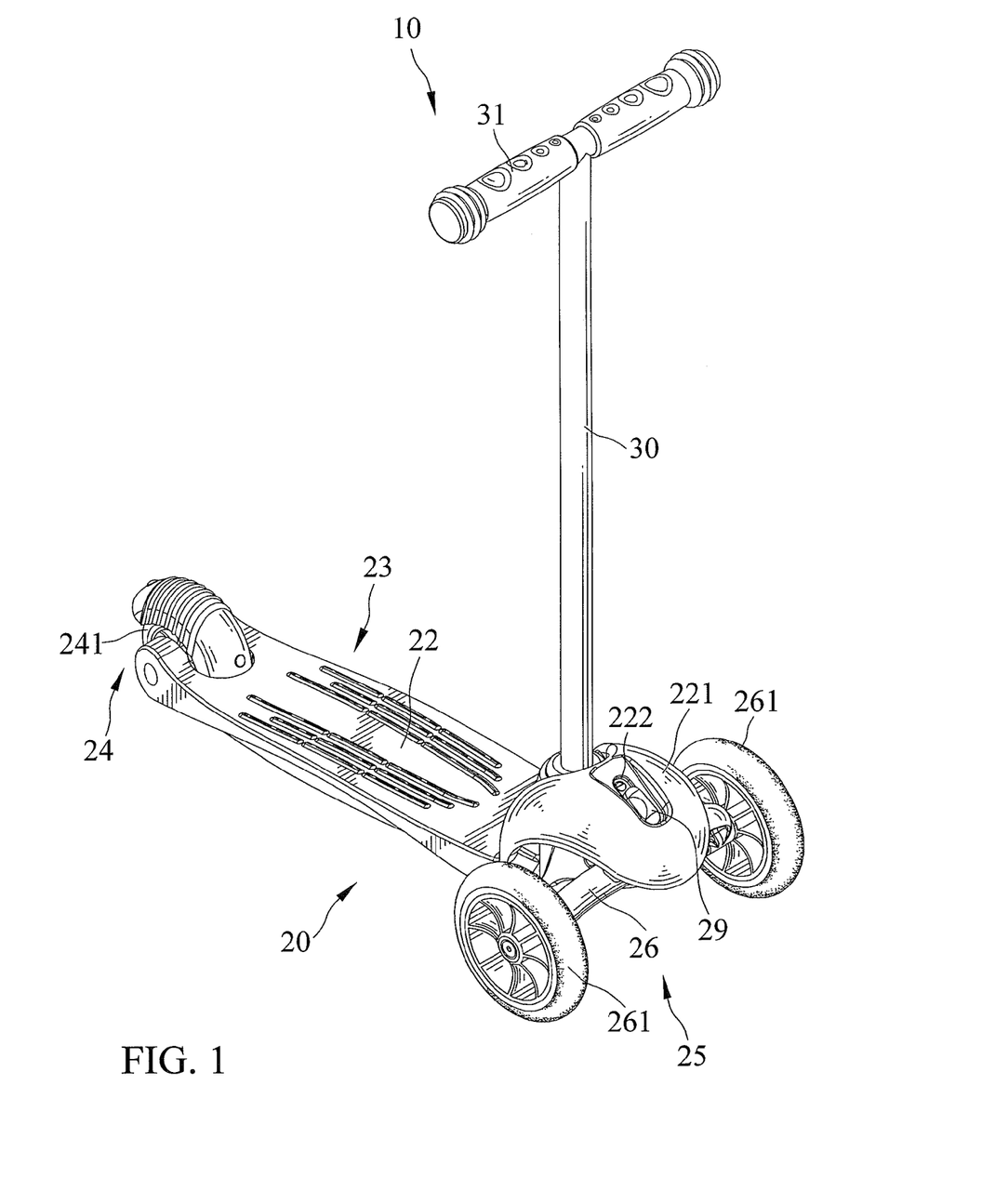
FIG. 1 shows a perspective view of a scooter according to the present invention.
Figure 2:
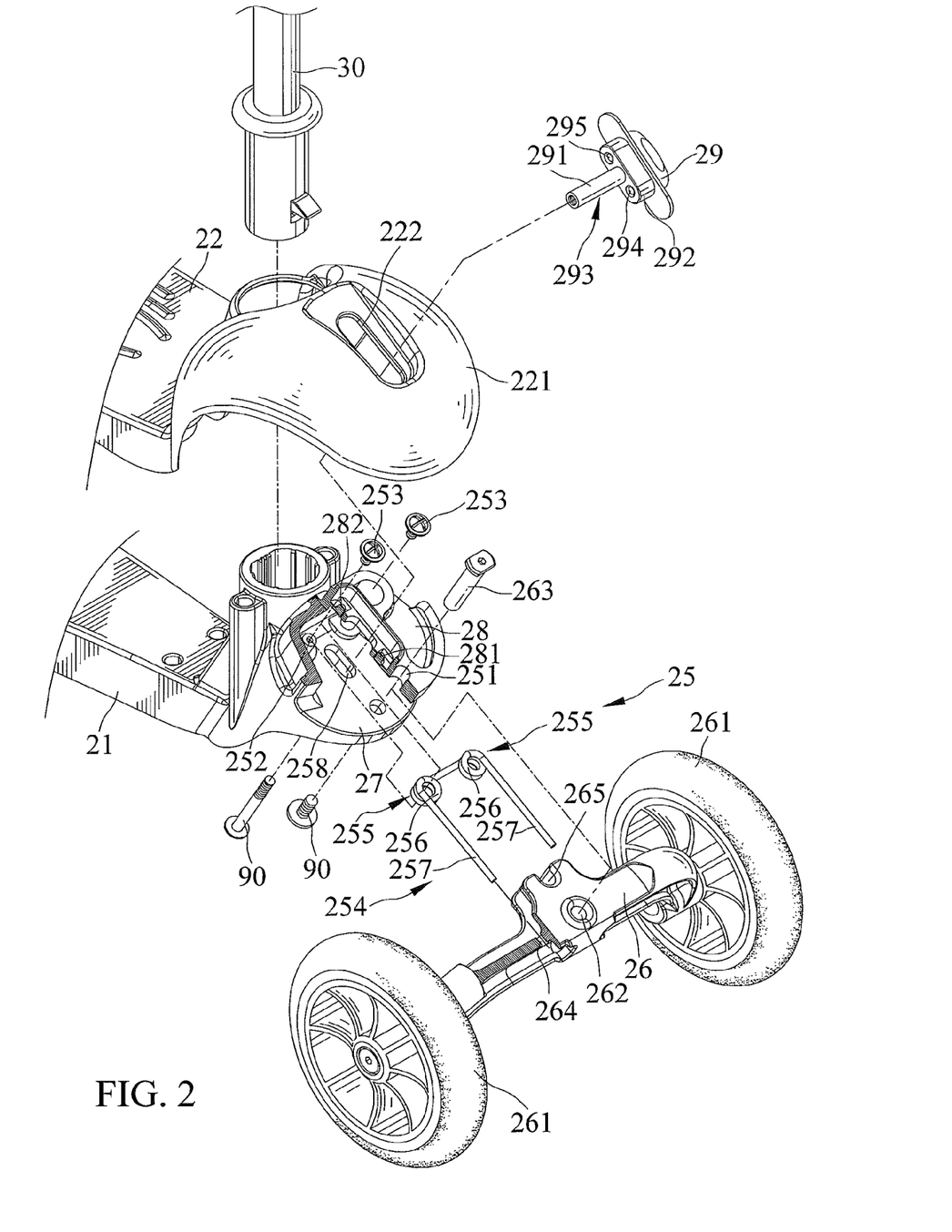
FIG. 2 shows a partial exploded, perspective view of the scooter of FIG. 1.
Figure 3:
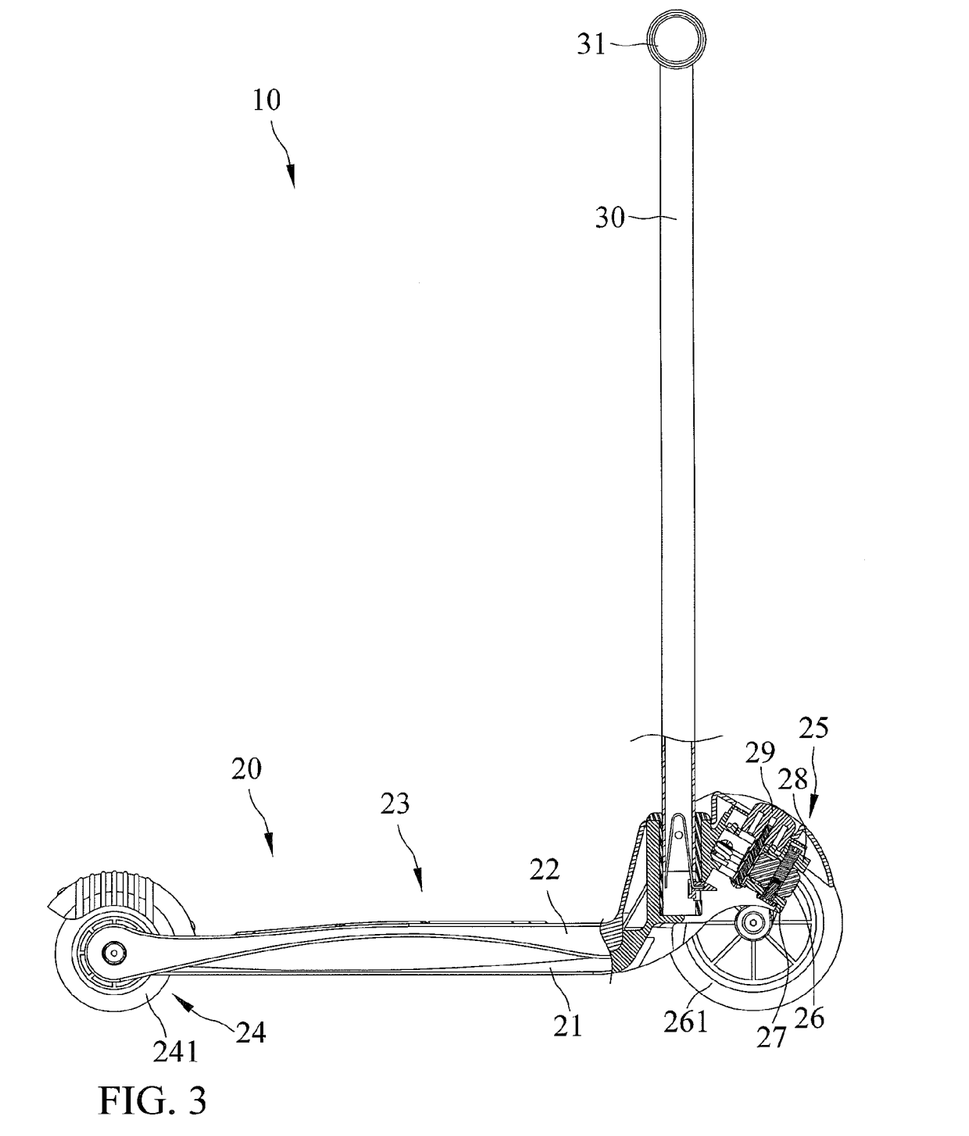
FIG. 3 shows a partial cross sectional view of the scooter of FIG. 1.
Figure 4:
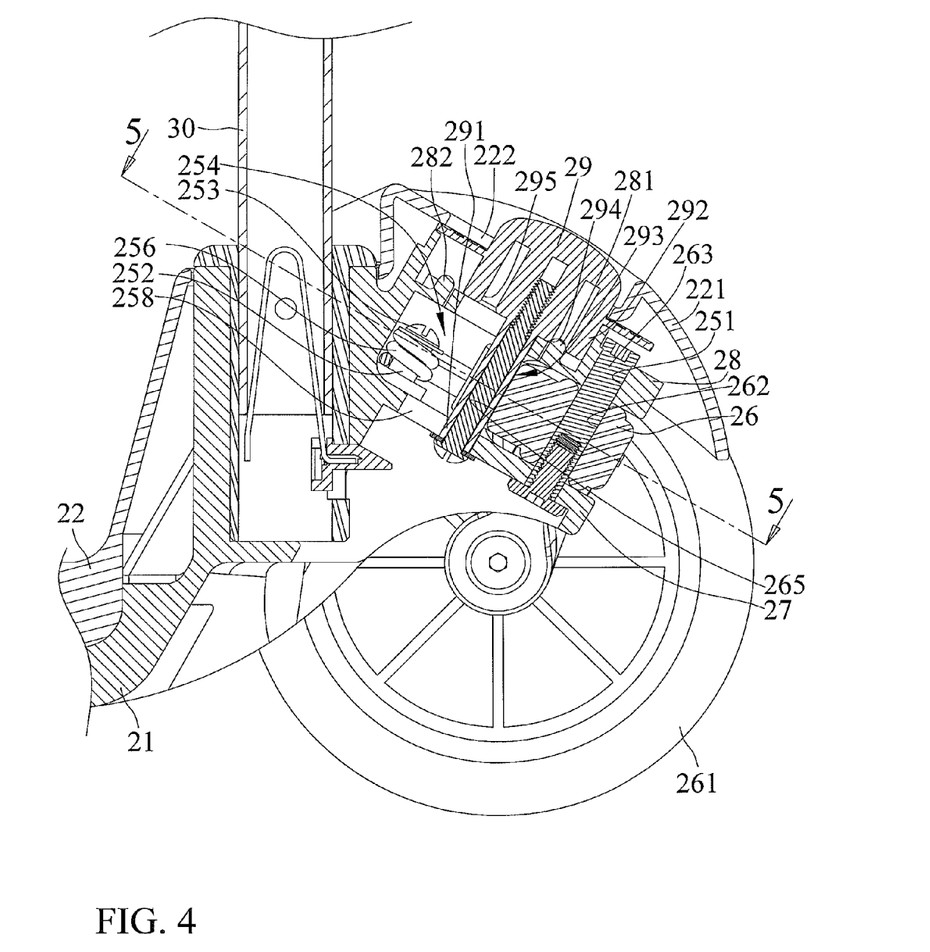
FIG. 4 shows a partial, enlarged view of the scooter shown in FIG. 3.
Figure 5:
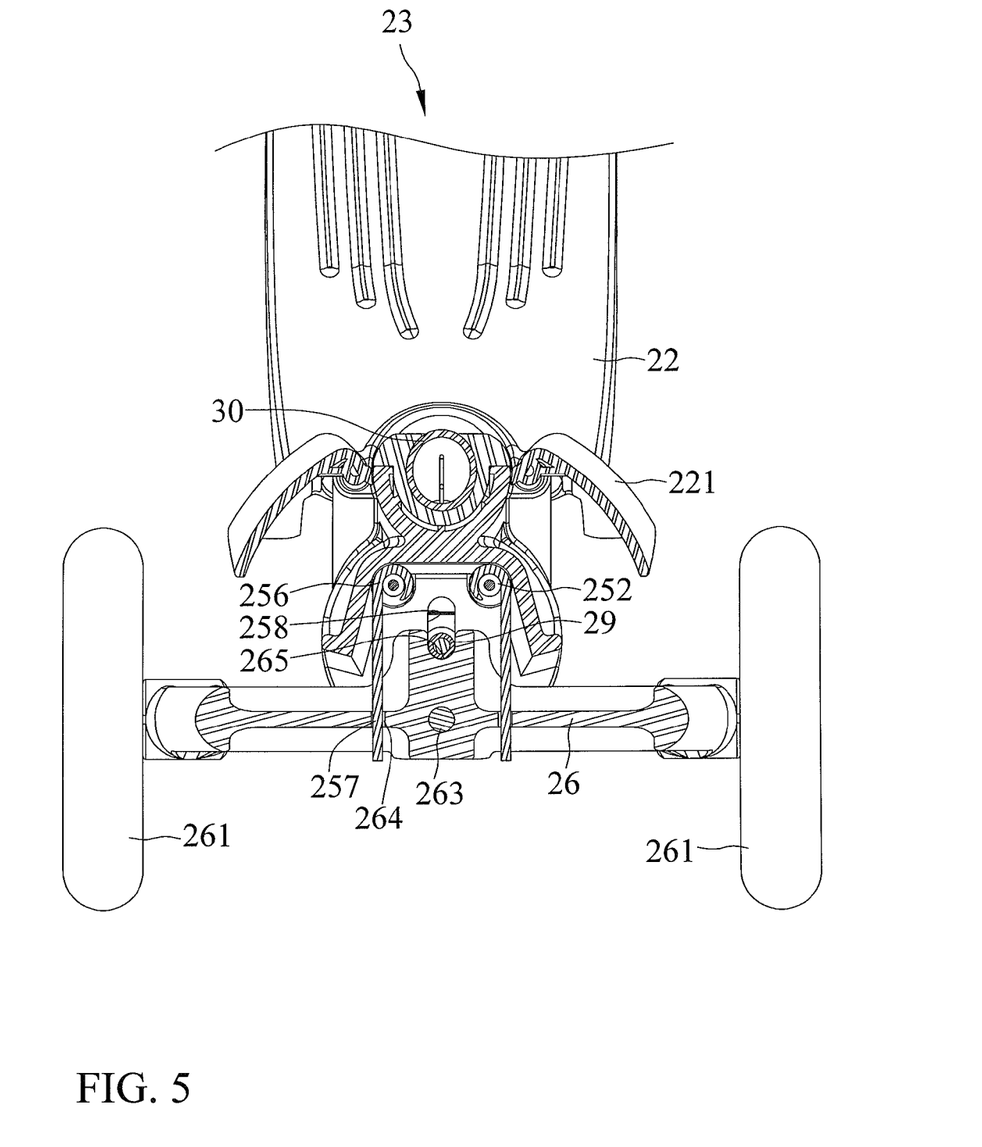
FIG. 5 shows a cross-sectional view taken along line 5-5 of FIG. 4.
Figure 6:
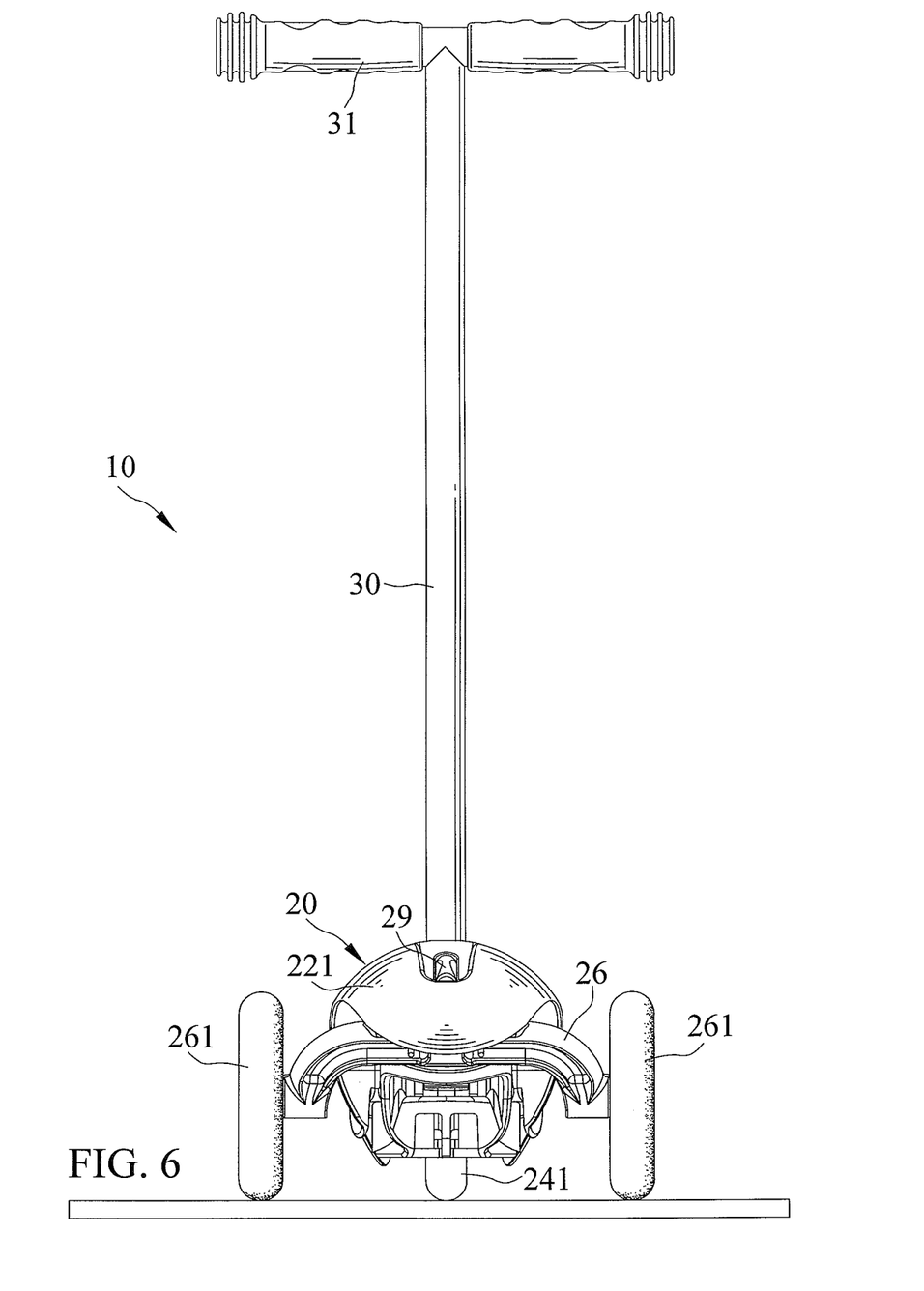
FIG. 6 shows a front view of the scooter of FIG. 1, and illustrates an engaging member in a first position with a wheel shaft in an initial position.
Figure 7:
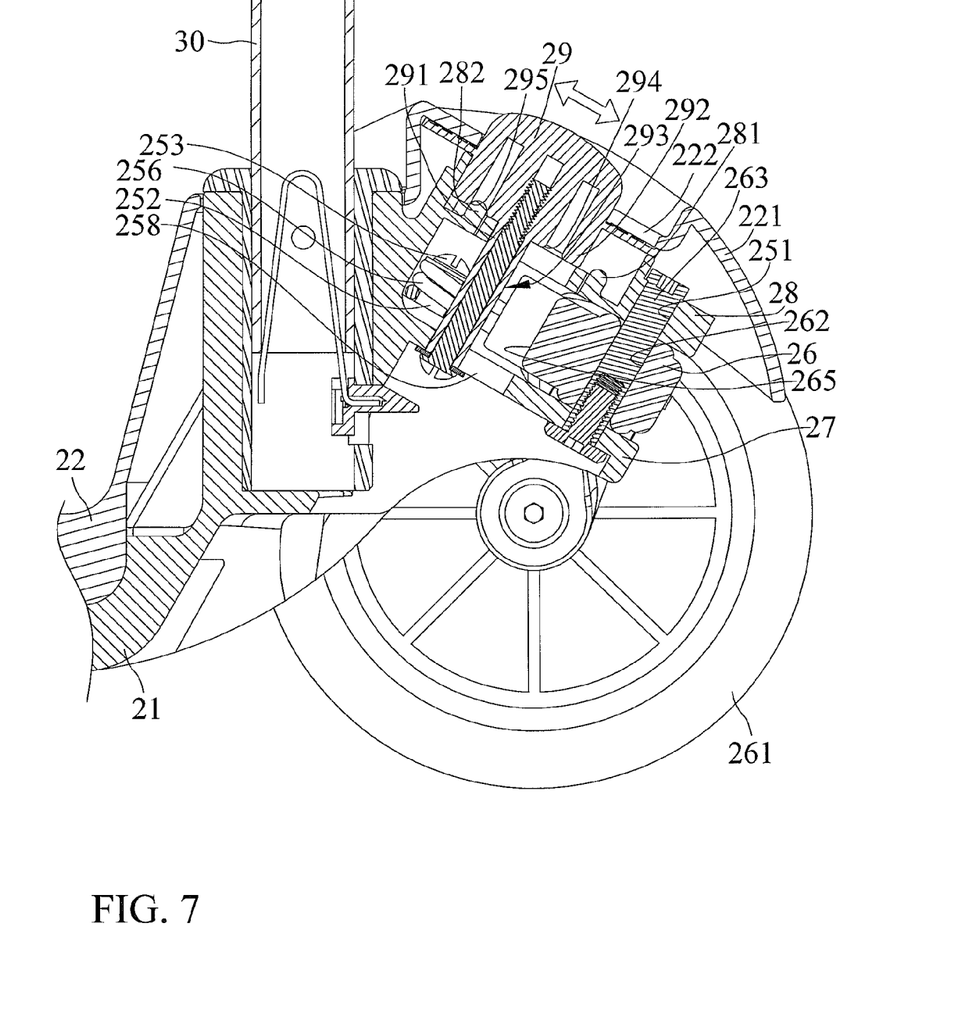
FIG. 7 shows a partial cross sectional view of the scooter of FIG. 6.
Figure 8:
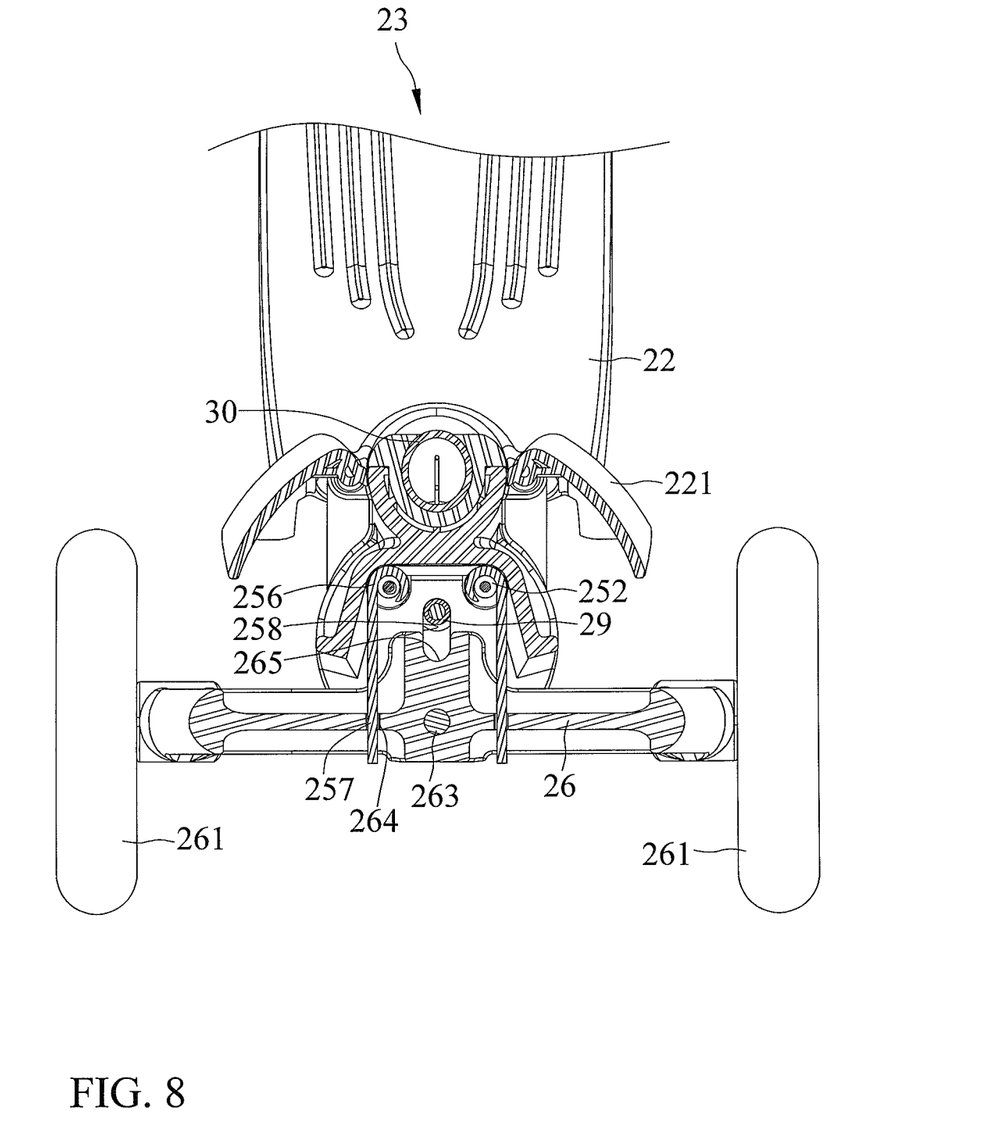
FIG. 8 shows another partial cross sectional view of the scooter of FIG. 6.
Figure 9:
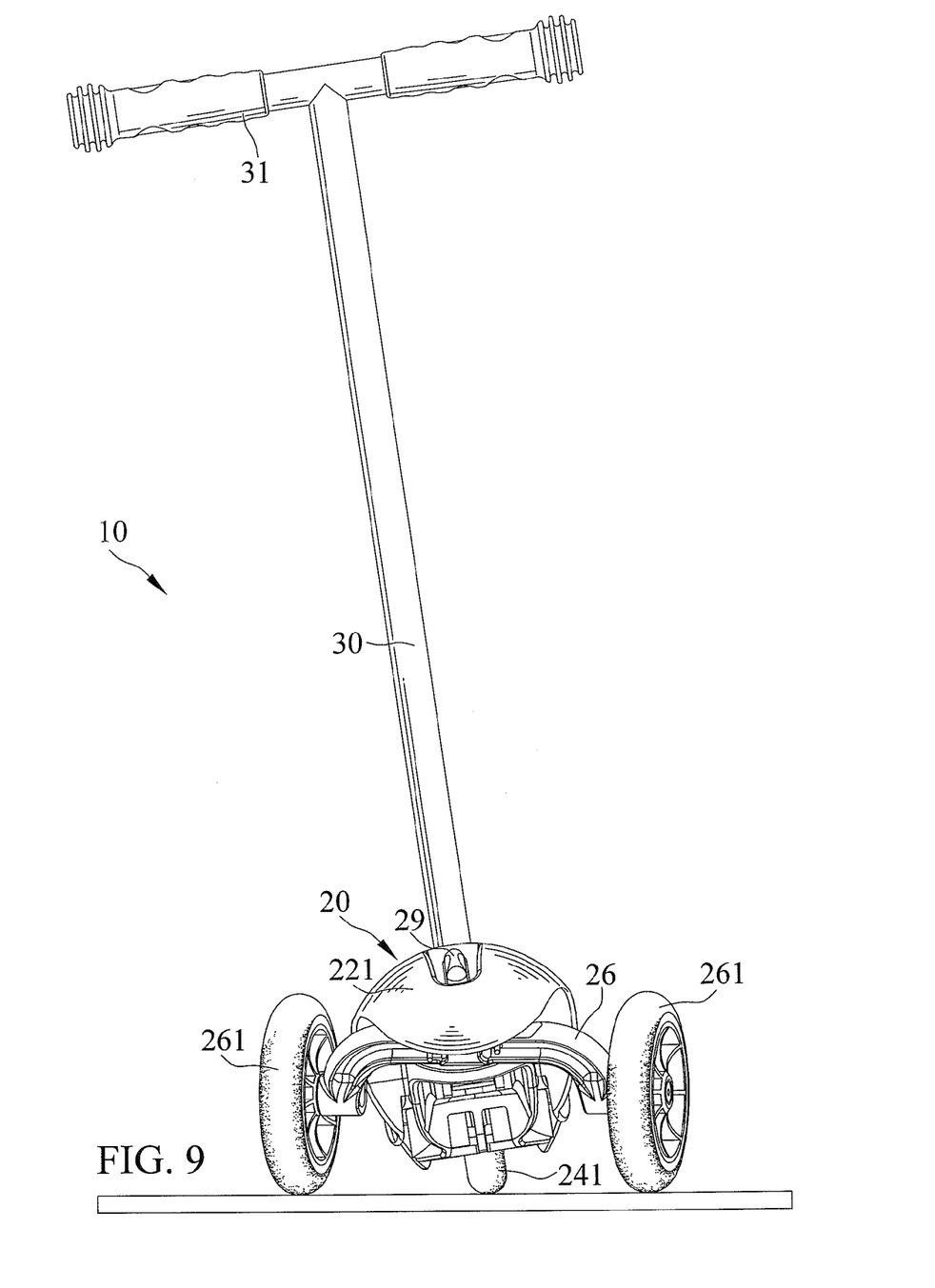
FIG. 9 shows a front view of the scooter of FIG. 1, and illustrates the engaging member in a second position with the wheel shaft pivoting with respect to an anterior portion to cause the scooter into a turn.
Figure 10:
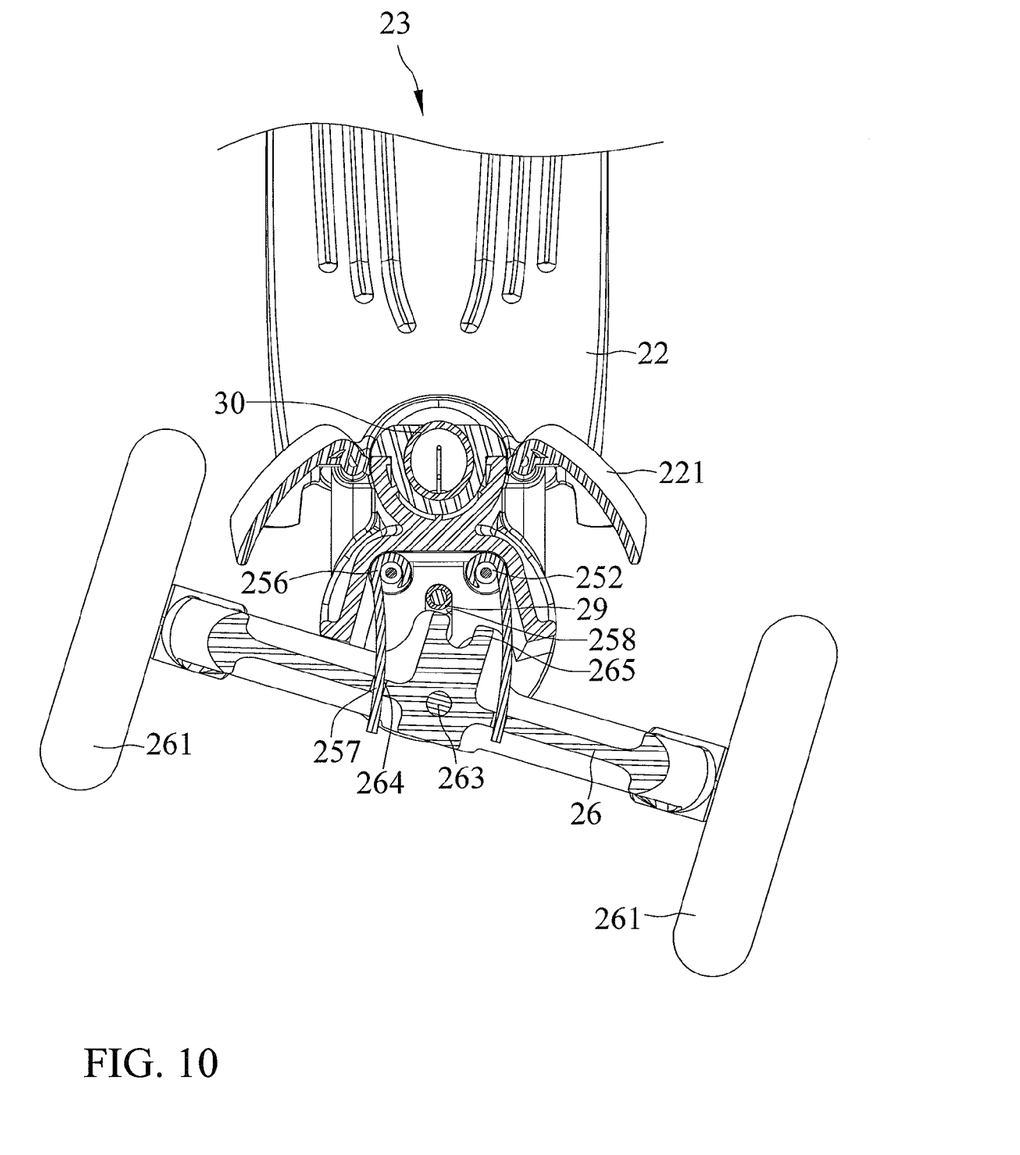
FIG. 10 shows a partial cross sectional view of the scooter of FIG. 9.
Figure 11:
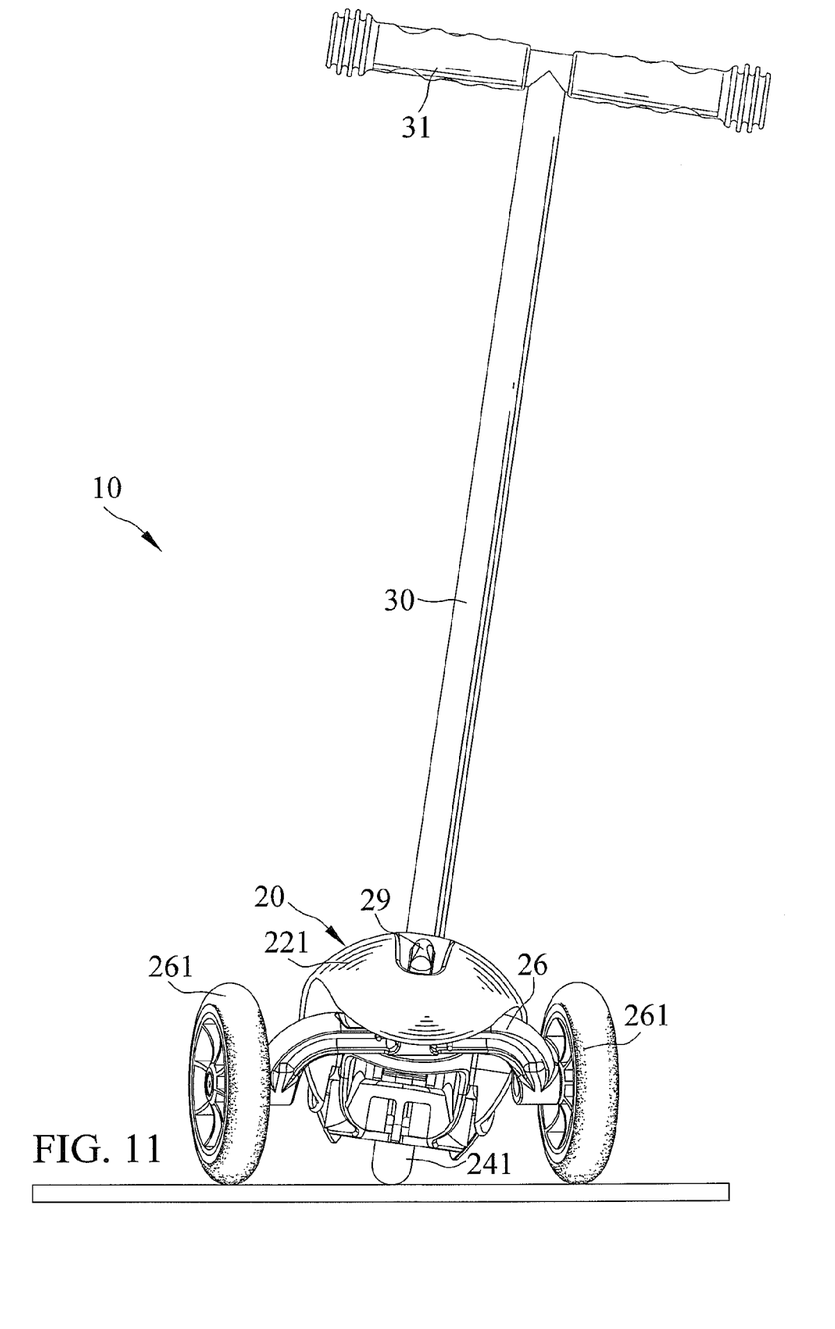
FIG. 11 shows continued view of the scooter of FIG. 9, and illustrates the scooter into an opposite turn.
Figure 12:
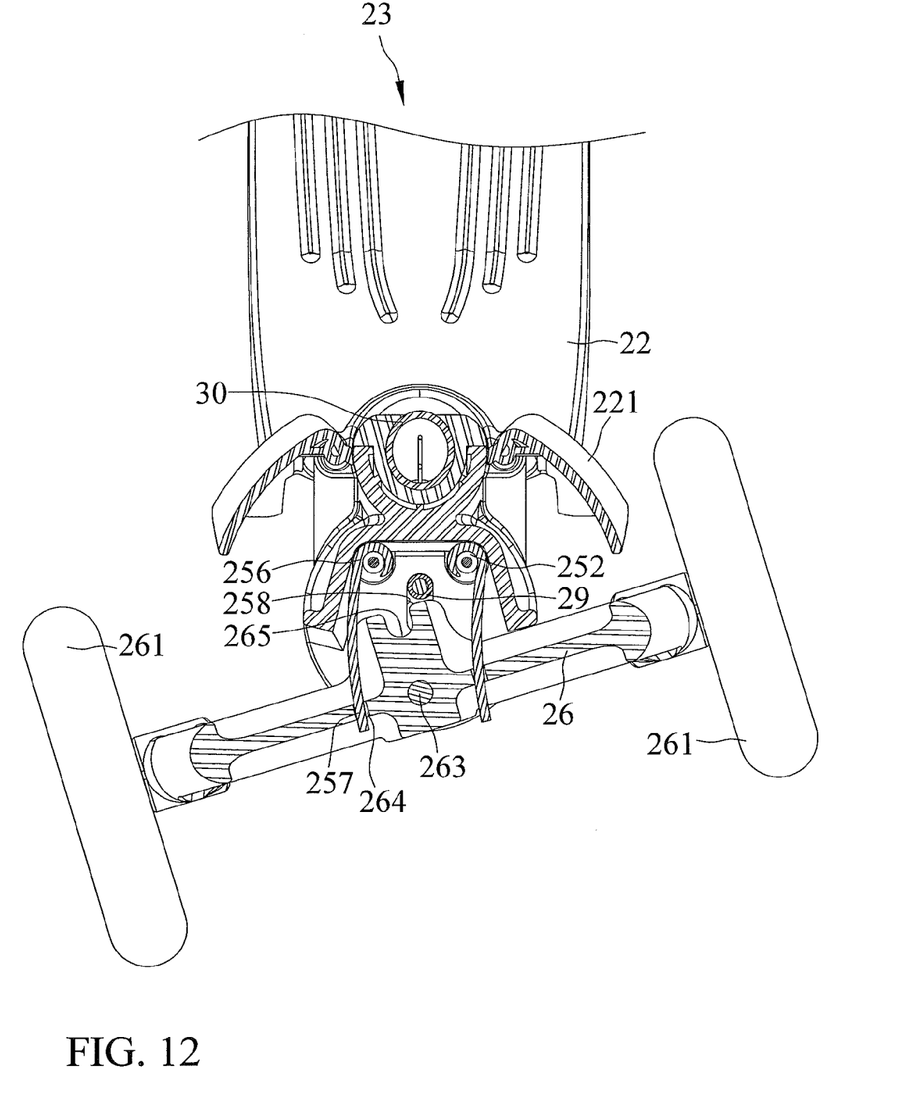
FIG. 12 shows a partial cross sectional view of the scooter of FIG. 11.

The handlebar 30 is substantively formed in a T-shape and mounted on the end of the deck assembly 20 adjacent to the anterior portion 25. The handlebar 30 includes a gripping portion 31 adapted to be gripped by the rider.

Therefore, the scooter 10 includes the rear wheel 241 and the pair of the front wheel 261 to provide a three-point support on the ground for rock solid stability, so that the scooter 10 is suitable for the rider having a poor sense of balance or slow reflexes. Thus, the scooter 10 is propelled by the rider pushing off the ground, even an uneven ground and not worry about the rider slipping. When the engaging member 29 is in the first position, the wheel shaft 26 is in an initial position and fixed with respect to the anterior portion 25 resulting that the scooter 10 can only propelled by the rider along a straight line. When the engaging member 29 is in the second position, the wheel shaft 26 is pivotable with respect to the anterior portion 25. Thus, the scooter 10 leaned lift/right results the pair of front wheels 261 leaned synchronously for swerving to the left/right. Moreover, the positions of the two apertures 264 are changed with the wheel shaft 26 pivoting in relation to the anterior portion 25, so that the two abutting portions 257 of the elastic member 254 engaged in the two apertures 264 are bent. When the scooter 10 is not leaned, the two abutting portions 257 of the elastic member 254 elastic recover and bias against the two apertures 264 of the wheel shaft 26 to cause the wheel shaft 26 restored to the initial position. The engaging member 29 is slidably received in and radially moved in relation to the first sliding slot 258 to prevent the engaging member 29 disengaged from the first sliding slot 258 due to the scooter 10 swerved and jolted, and to ensure the scooter 10 safe to use.

The scooter 10 includes the following advantages:

1. The engaging member 29 is operated between first and second positions to selectively providing steering function of the scooter 10. The engaging member 29 in the first position engages with the engaging recess 265 of the wheel shaft 26 to cause the wheel shaft 26 fixed with respect to the anterior portion 25. The engaging member 29 in the second position disengages from the engaging recess 265 of the wheel shaft 26 to cause the wheel shaft 26 pivotable with respect to the anterior portion 25.

2. The engaging member 29 is slidably received in and radially moved in relation to the first sliding slot 258 to prevent the engaging member 29 disengaged from the first sliding slot 258 due to the scooter 10 swerved and jolted, and to ensure the scooter 10 safe to use.

Now that the basic teachings of the scooter have been explained, many extensions and variations will be obvious to one having ordinary skill in the art. For example, deck assembly 20, and the handlebar 30 can have shapes different from those shown in the figures.

Thus since the illustrative embodiment disclosed herein may be embodied in other specific forms without departing from the spirit or general characteristics thereof, some of which forms have been indicated, the embodiment described herein is to be considered in all respects illustrative and not restrictive. The scope is to be indicated by the appended claims, rather than by the foregoing description, and all changes which come within the meaning and range of equivalency of the claims are intended to be embraced therein.

What is claimed is:

1. A scooter comprising:
   a deck assembly including a pedal portion, a posterior portion, and an anterior portion, with the posterior and anterior portions arranged at two opposite ends of the pedal portion, with the posterior portion pivotally connected with a rear wheel, with the anterior portion pivotally connected with a wheel shaft, with a pair of front wheels pivotally connected with two opposite ends of the wheel shaft, with the anterior portion having a first sliding slot, with the wheel shaft having an engaging recess, with an engaging member sildably received in the first sliding slot to selectively engage with the engaging recess between first and second positions, with the wheel shaft fixed with respect to the anterior portion in the first position; and
   a handlebar mounted on one end of the deck assembly adjacent to the anterior portion.

2. The scooter as claimed in claim 1, wherein the engaging member is radially slidable with respect to the first sliding slot.

3. The scooter as claimed in claim 2, wherein the anterior portion includes bottom and top sections faced each other, with the wheel shaft arranged between the bottom and top sections, with the first sliding slot penetrating through the bottom and top sections.

4. The scooter as claimed in claim 3, wherein the deck assembly includes first and second boards connected with each other, with the first and second boards collectively form the pedal portion and the posterior portion, with the second board formed the anterior portion.

5. The scooter as claimed in claim 4, wherein the anterior portion has a first pivoting hole penetrating through the bottom and top sections, with the wheel shaft having a second pivoting hole, with a fastener passing through the first and second pivoting holes and engaging with a bolt to cause the wheel shaft pivotable with respect to the anterior portion.

6. The scooter as claimed in claim 4, wherein the top section of the anterior portion includes first and second bumps arranged adjacent to two opposite ends of the first sliding slot, with the engaging member including first and second apertures respectively extending therethrough, with the first aperture engaged with the first bump in the first position, with the second aperture engaged with the second bump in the second position.

7. The scooter as claimed in claim 4, wherein the anterior portion further includes two positioning columns, two positioning members, and an elastic member, with the two positioning columns respectively formed on the bottom section and extended toward the top section, with the elastic member including two turning portions, with each of the two turning portions formed a torsion section, with the two turning portions engaged with the two positioning columns, with each of the two positioning members mounted to one end of each of the two positioning columns opposite to the bottom section and abutted against the elastic member, with the wheel shaft having two apertures, with the elastic member formed two abutting portions extending from the two torsion sections, with two opposite ends of the elastic member engaged into the two apertures, with the two abutting portions abutted against the wheel shaft.

8. The scooter as claimed in claim 7, wherein one end of the second board opposite to the posterior portion is formed a fender portion, with the fender portion covering on the anterior portion and including a second sliding slot corresponding to the first sliding slot, with the engaging member including first and second sliding portions, and an engaging portion formed at the first sliding portion, with the first sliding portion received in the first sliding slot, with the second sliding portion received in the second sliding slot.

9. The scooter as claimed in claim 8, wherein the elastic member is U-shaped, with the first and second sliding slots being formed in an oval shape.

10. The scooter as claimed in claim 1, wherein the anterior portion includes bottom and top sections faced each other, with the wheel shaft arranged between the bottom and top sections, with the first sliding slot penetrating through the bottom and top sections.

11. The scooter as claimed in claim 10, wherein the deck assembly includes first and second boards connected with each other, with the first and second boards collectively formed the pedal portion and the posterior portion, with the second board formed the anterior portion.

12. The scooter as claimed in claim 11, wherein the anterior portion has a first pivoting hole penetrating through the bottom and top sections, with the wheel shaft having a second pivoting hole, with a fastener passing through the first and second pivoting holes and engaging with a bolt to cause the wheel shaft pivotable with respect to the anterior portion.

13. The scooter as claimed in claim 11, wherein the top section of the anterior portion includes first and second bumps arranged adjacent to two opposite ends of the first sliding slot, with the engaging member including first and second apertures respectively extending therethrough, with the first aperture engaged with the first bump in the first position, with the second aperture engaged with the second bump in the second position.

14. The scooter as claimed in claim 11, wherein the anterior portion further includes two positioning columns, two positioning members, and an elastic member, with the two positioning columns respectively formed on the bottom section and extended toward the top section, with the elastic member including two turning portions, with each of the two turning portions formed a torsion section, with the two turning portions engaged with the two positioning columns, with each of the two positioning members mounted to one end of each of the two positioning columns opposite to the bottom section and abutted against the elastic member, with the wheel shaft having two apertures, with the elastic member formed two abutting portions extending from the two torsion sections, with two opposite ends of the elastic member engaged into the two apertures, with the two abutting portions abutted against the wheel shaft.

15. The scooter as claimed in claim 14, wherein one end of the second board opposite to the posterior portion is formed a fender portion, with the fender portion covering on the anterior portion and including a second sliding slot corresponding to the first sliding slot, with the engaging member including first and second sliding portions, and an engaging portion formed at the first sliding portion, with the first sliding portion received in the first sliding slot, with the second sliding portion received in the second sliding slot.

16. The scooter as claimed in claim 15, wherein the elastic member is U-shaped, with the first and second sliding slots being formed in an oval shape.

17. The scooter as claimed in claim 1, wherein the handlebar is formed in a T-shape and includes a gripping portion adapted to be gripped by a rider.

\* \* \* \* \*